June 22, 1943. B. T. ANDERSON 2,322,335
REVERSIBLE MAGNETIC BRAKE
Filed Aug. 30, 1941
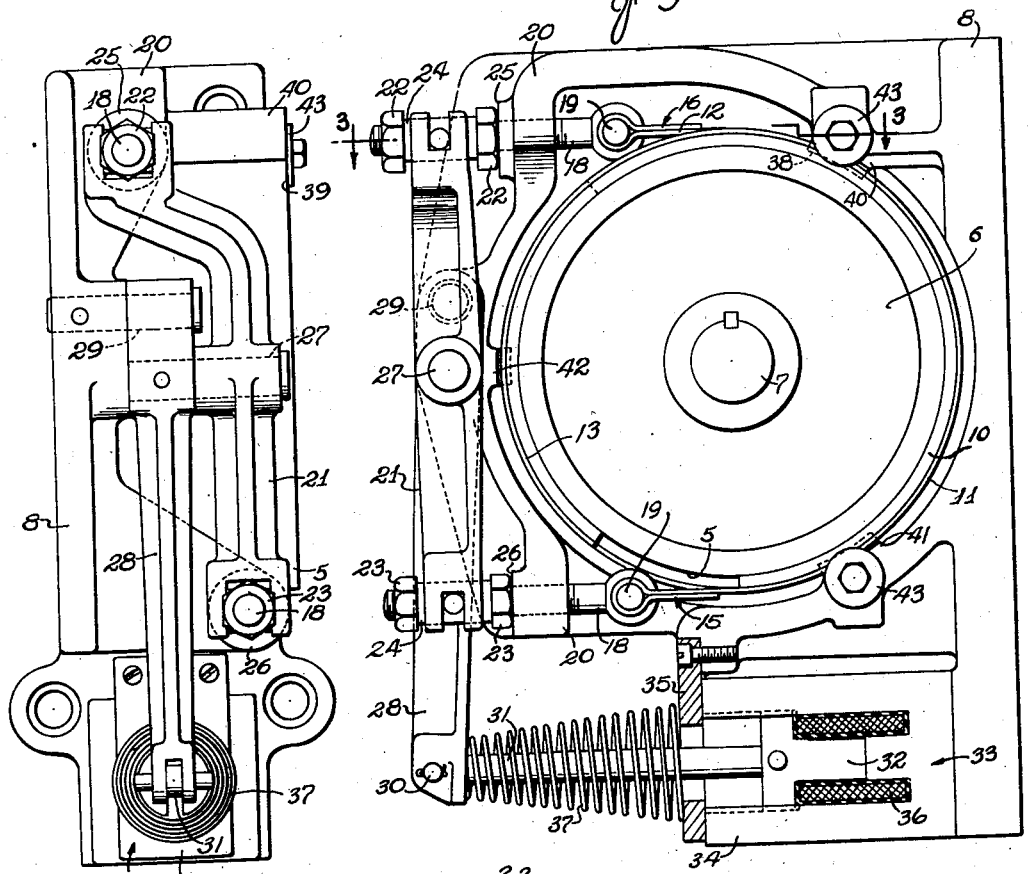
Fig. 1
Fig. 2
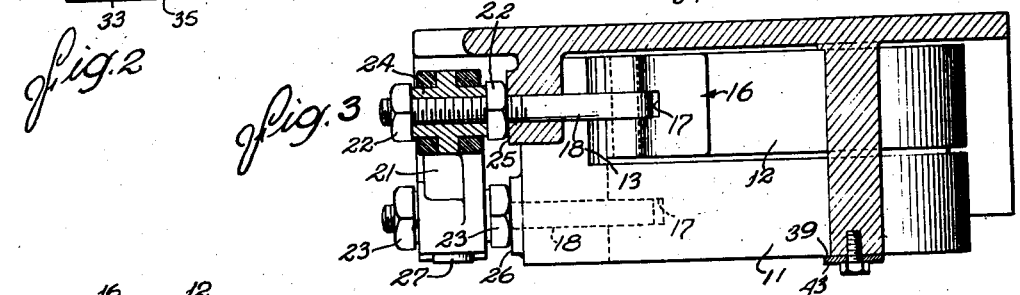
Fig. 3
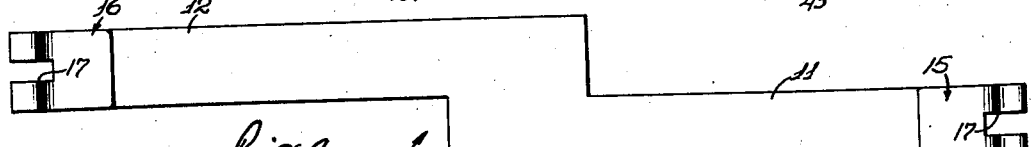
Fig. 4
INVENTOR
Bentil T. Anderson
By Parker, Carlson, Pitzner, Hubbard
ATTORNEYS Patented June 22, 1943

2,322,335

UNITED STATES PATENT OFFICE 2,322,335

REVERSIBLE MAGNETIC BRAKE

Bertil T. Anderson, Rockford, Ill.

Application August 30, 1941, Serial No. 408,965

6 Claims. (Cl. 188—77)

This invention relates to friction brakes of the contracting band type and more particularly to those in which the band, when contracted, is adapted to anchor at either end and thereby develop a servo or self-energization action for augmenting the braking force. In brakes of this character heretofore devised, the flexible band engages the drum over a zone substantially less than the full drum circumference. While this avoids the development of an uncontrollable wrapping effect, it places a fixed limitation on the brake output.

The main object of the present invention is to provide a magnetically controlled brake of the above character in which the band engages the drum through substantially more than one revolution with a consequent increase in self-energization and retarding effect, and this, without rendering the brake uncontrollable or preventing proper release thereof.

The invention also resides in the novel construction and arrangement of the parts for carrying out the foregoing object.

Other objects and advantages of the invention will become apparent from the following detailed description taken in connection with the accompanying drawing, in which Figure 1 is a side elevational view of the improved brake.

Fig. 2 is a side elevational view of the brake as shown in Fig. 1.

Fig. 3 is a section taken along the line 3—3 of Fig. 1.

Fig. 4 is a development of the brake band.

The brake shown by way of illustration is particularly adaptable for use with motor driven machines and includes a drum surface 5 of cylindrical contour constituting the exterior of a pulley 6 fast on the driving shaft 7 of the machine to be retarded when the brake is applied. The shaft is journaled in bearings (not shown) supported on a frame 8 which may be bolted to the main frame of the machine.

The brake band indicated at 9 comprises a flexible metal strip and a lining 10 of friction material wrapped helically around the drum surface 5 and of a length in the present instance such as to engage the surface through one and one-half turns. As shown, the brake band comprises two end portions 11 and 12 laterally offset from each other as shown in Fig. 4 and connected by a double width portion 13 which occupies approximately one-quarter of the drum circumference. This widened portion is disposed between the reversely bent ends 15 and 16 of the portions 11 and 12, which ends are disposed parallel to each other on opposite sides of the drum and project in the same direction tangentially of the drum surface toward the side on which the widened portion 13 is disposed.

The reversely bent ends 15 and 16 are slotted as indicated at 17 to receive the heads of bolts 18 to which they are connected by cross pins 19. The bolts are guided for endwise movement in ribs 20 on the frame 8 and their threaded ends project through the forked ends of a bar 21, one end of which is offset to aline the band and bar ends. Nuts 22 and 23 tightened against opposite ends of sleeves 24 may be adjusted to vary the effective length of the band. Movement of the ends toward the drum is limited by engagement of the nuts with stop surfaces 25 and 26 on the frame ribs.

The bar 21 is fulcrumed at its center on a stud 27 projecting laterally from a lever 28 fulcrumed on an adjacent stud 29 rigid with the frame 8 and parallel to the stud 27. By swinging the lever, the bar 21 will be moved bodily toward and away from the drum. To increase the mechanical advantage of the applied actuating force, the free end of the lever is extended to a point externally of the drum and connected by a pin 30 to one end of a rod 31. The other rod end carries the T-shaped armature 32 of a magnet 33 having an E-shaped core 34 providing a guide for the armature and mounted rigidly on a plate 35 bolted to the frame 8. A coil 36 enclosing the center leg of the core may be connected across the terminals of the motor driving the shaft 7 so as to be energized and deenergized automatically as incidents to starting and stopping of the motor. Swinging of the lever away from the drum to apply the brake is caused by a spring 37 acting in compression between the free end of the lever 28 and the plate 35.

Opposite end portions of the band are held against lateral displacement on the drum by three pairs of guide surfaces 38 and 39 equally spaced around the drum and formed on projections 40, 41, and 42 on the frame 8. The surfaces 38 on the projections 40 and 41 and both surfaces on the projection 42 are milled on the projections while the other surfaces 39 are defined by washers 43 screwed to the ends of the projections. The projection 42 is disposed adjacent the actuating bar 21 and acts on the widened portion 13 of the band. The projections 40 and 41 are positioned a short distance around the drum from the points of tangency with the band ends and on the side of the drum diameter 44 away from the actuator bar. In these locations, the projections 40 and 41 serve not only to hold the band on the drum but also to insure proper expansion of the latter and release of the brake when the bar 21 is retracted toward the drum. Thus, since the releasing forces are applied to the band ends by the bar 21 in directions tangentially of the drum and longitudinally of the band ends, the latter are shifted endwise and bending of the ends away from the drum is prevented by the projections 40 and 41. Any possibility of buckling of the band end away from the drum is thus prevented and proper release of the brake is insured.

The operation of the brake is as follows, assuming that the drum is rotating clockwise and the parts are in the released positions shown, the magnet being energized and the bar being drawn toward the drum against the action of the spring 37 with one nut 23 held against its stop 26 and the corresponding nut 22 spaced slightly away from its stop 25 to provide enough clearance to let the solenoid armature come into full contact with the coil as shown in Fig. 1. When the coil 36 is deenergized, the free end of the lever 28 is moved outwardly by the spring 37 carrying the bar 21 bodily away from the drum. The pull thus exerted on the band ends contracts the band around the drum and the resulting gripping engagement causes the band to turn slightly with the drum. This rocks the bar 21 until the band end 16 becomes anchored by engagement of the nut 22 with the stop surface 25. Thereupon, a powerful self-energizing or wrapping action is developed throughout the full length of the contact between the band and the drum surface and this results in a substantial augmentation of the frictional retarding force developed. Now, when the magnet is again energized to release the brake, the attractive force of the magnet is applied in a truly endwise direction to the actuated end 15 of the band which end is guided effectually by the projection 41 so as to insure proper expansion of the band in spite of the tendency of the self-energizing action to hold the brake applied.

A similar action takes place when the magnet is deenergized with the drum rotating in a counter-clockwise direction. In this case, the actuating bar is rocked reversely as the band is contracted against the drum, and the band end 15 is moved with the drum until the nut 23 comes against the stop 26. The force of the magnet is first applied to the band end 16 when the magnet is again energized to release the brake.

In spite of the fact that the band is wrapped more than one turn around the drum for the purpose of increasing the wrapping effect and therefore the total retarding force, the brake above described has been found in practice to be controllable readily and to release properly in response to energization of the magnet. So effective is the releasing action that the brake may be utilized to advantage in controlling the jogging feed motions in a machine tool.

I claim as my invention:

1. A friction brake having, in combination, a rotatable drum providing an external friction surface, a band wrapped around said surface through more than one revolution with its opposite end portions projecting tangentially in the same direction from opposite sides of the drum, a bar projecting transversely of the ends of said portions with its ends pivotally connected to the latter ends, a lever pivotally supporting said bar intermediate its ends for movement toward and away from said drum, stops to limit the movement of the bar ends toward said drum, spring means acting on said lever and urging said bar away from the drum whereby said bar fulcrums on one or the other of said stops to hold one band end while the other end is moved to contract said band, an electromagnet adapted when energized to overcome said spring and urge said bar toward said drum whereby to press both of said band ends tangentially, and guides acting on said band to prevent buckling of the actuated end portion of the band when said magnet is energized whereby to insure proper expansion of the band.

2. A friction brake having, in combination, a rotatable drum providing an external friction surface, a band wrapped around said surface through more than one revolution with its opposite end portions projecting tangentially in the same direction from opposite sides of the drum, a bar projecting transversely of the ends of said portions with its ends pivotally connected to the latter ends, a member mechanically connected to said bar intermediate its ends for moving the bar toward and away from said drum, electromagnetic actuating means acting on said member, stops to limit the movement of the bar ends toward said drum, and guides acting on said band to prevent buckling of the end portions of the band when said bar is moved toward the drum to expand the band.

3. A friction brake having, in combination, a rotatable drum providing an external friction surface, a band wrapped around said surface through more than one revolution with its opposite end portions projecting tangentially in the same direction from opposite sides of the drum, a bar projecting transversely of the ends of said portions with its ends pivotally connected to the latter ends, means connected to said bar intermediate its ends for moving the bar toward and away from said drum, stops to limit the movement of the bar ends toward said drum, and guides engaging said band at points disposed adjacent the points of tangency between the band and drum and acting to hold the band ends against movement away from the drum, said points of engagement being spaced around the drum from said points of tangency in directions away from said bar.

4. A friction brake having, in combination, a rotatable drum providing an external friction surface, a band wrapped around said surface through more than one revolution with its opposite end portions projecting tangentially in the same direction from opposite sides of the drum, a bar projecting transversely of the ends of said portions with its ends pivotally connected to the latter ends, electromagnetic actuating means, means actuated thereby and mechanically connected to said bar intermediate its ends for applying the actuating force at a single point to said bar to move the latter toward and away from said drum, stops to limit the movement of the bar ends toward said drum, and guides engaging said band at points disposed adjacent the points of tangency between the band and drum and acting to hold the band ends against movement away from the drum.

5. A friction brake having, in combination, a rotatable drum providing an external friction surface, a band wrapped around said surface through more than one revolution with its opposite end portions projecting tangentially in the same direction from opposite sides of the drum, a bar projecting transversely of the ends of said portions with its ends pivotally connected to the latter ends, a lever pivotally supporting said bar intermediate its ends for movement toward and away from said drum, said lever lying alongside said bar with its free end projecting beyond one end of the bar and one side of said drum, and a magnet disposed adjacent the latter side of the drum and having an armature connected to the free end of said lever and reciprocable in a direction generally perpendicular to said bar and lever.

6. A friction brake having, in combination, a rotatable drum providing an external friction surface, a band wrapped around said surface through more than one revolution with its opposite end portions projecting tangentially in the same direction from opposite sides of the drum, a bar projecting transversely of the ends of said portions with its ends pivotally connected to the latter ends, a lever pivotally supporting said bar intermediate its ends for movement toward and away from said drum, said lever lying alongside said bar with its free end projecting beyond one end of the bar and one side of said drum, an actuating member connected to said free end of said lever and reciprocable along a path disposed adjacent but offset from said drum and extending generally perpendicular to said bar and lever, and power driven means for actuating said member to tighten and release said band.

BERTIL T. ANDERSON.